United States Patent [19]
Jones

[11] 3,736,546
[45] May 29, 1973

[54] ILLUMINATION PLATTER ON A MOBILE VEHICLE

[76] Inventor: Jack D. Jones, 11508 N. Victoria, Oklahoma City, Okla.

[22] Filed: May 3, 1971

[21] Appl. No.: 141,047

Related U.S. Application Data

[62] Division of Ser. No. 782,640, Dec. 10, 1968, Pat. No. 3,582,210.

[52] U.S. Cl. ................................. 338/15, 250/200
[51] Int. Cl. .......................................... H01c 7/08
[58] Field of Search .................. 356/218; 338/15; 250/211 R, 200, 213 R

[56] References Cited
UNITED STATES PATENTS

| | | | |
|---|---|---|---|
| 2,674,677 | 4/1954 | Anderson et al. | 338/15 |
| 3,400,276 | 9/1968 | Zinn | 250/211 R |
| 3,340,763 | 9/1967 | Power | 250/211 R X |
| 2,644,852 | 7/1953 | Dunlap, Jr. | 338/15 UX |
| 3,389,267 | 6/1968 | Aconsky | 338/15 X |
| 2,674,700 | 4/1954 | Small | 338/15 X |

Primary Examiner—C. L. Albritton
Attorney—Dunlap, Laney, Hessin & Dougherty

[57] ABSTRACT

An illumination plotter for plotting illumination characteristics of thoroughfare lighting systems including a vehicle, an adjustable length, horizontally extending, supporting bar mounted on the top of said vehicle, and a pair of light intensity sensing devices mounted on opposite ends of the supporting bar. The sensing devices are connected to an amplifier carried in the vehicle, and the amplifier is connected to a recording system. The sensing devices each have convex, upwardly facing light sensitive surfaces to obtain maximum exposure to light emanating from above.

3 Claims, 8 Drawing Figures

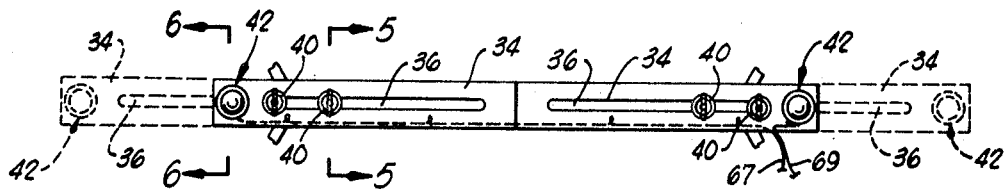
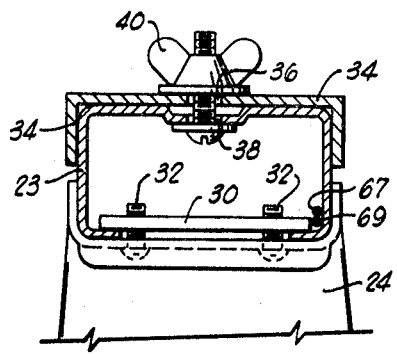
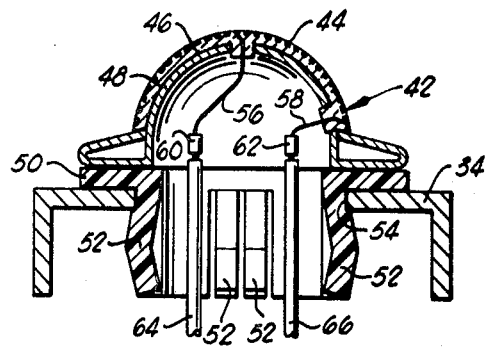
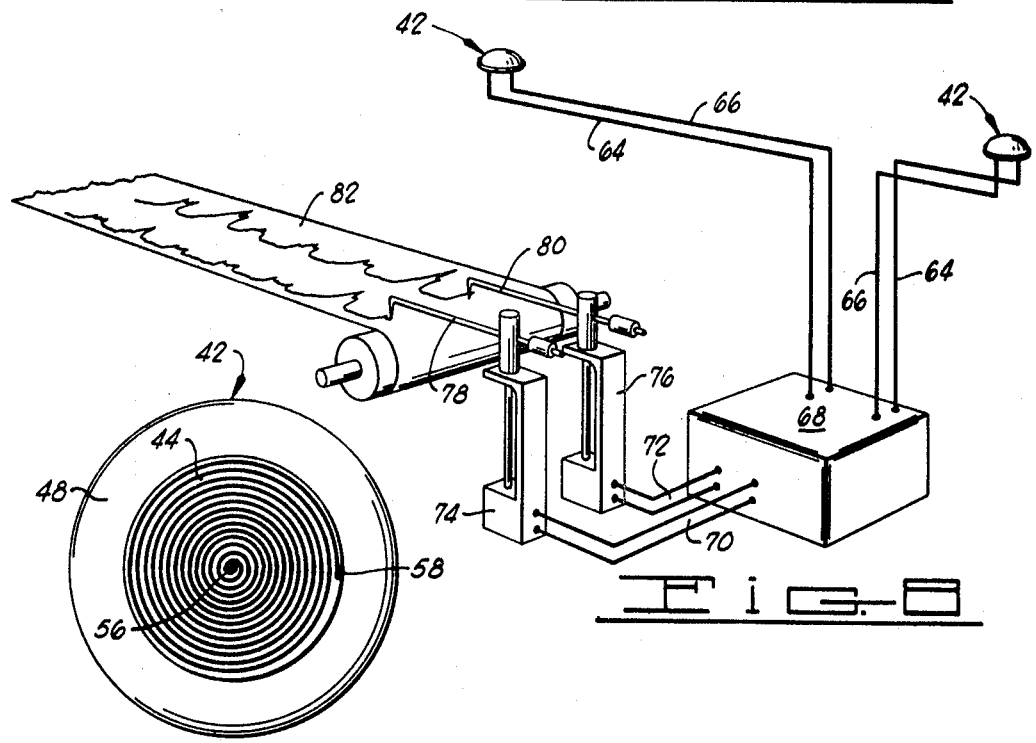

ILLUMINATION PLATTER ON A MOBILE VEHICLE

This is a division of application Ser. No. 782,640, filed Dec. 10, 1968, now U.S. Pat. No. 3,582,210.

BACKGROUND OF THE INVENTION

Field of the Invention

This invention relates to the field of illumination engineering, and more specifically, to apparatus useful for ascertaining the level or intensity of illumination along a street or highway at night.

Brief Description of the Need for the Invention

In modern thoroughfare design, construction and maintenance, the provision of adequate lighting is an important consideration, since the safety of both vehicles and pedestrians is directly related to this portion of the system. In present designs in which complex mercury vapor luminaires are often used as the source of illumination, the luminaires are most often located near the side of, and relatively high above, the roadway. In order to provide data for designers of new thoroughfare illumination systems, and perhaps more importantly, for the purpose of periodically checking the performance and sufficiency of existing systems to permit their maintenance or replacement, it is desirable to provide a means for determining the levels of light intensity existent at all points along the entire length of the thoroughfare.

Brief Description of the Invention

The present invention provides an efficient, easily used apparatus for providing data on the performance of thoroughfare illumination systems. Broadly described, the invention is an illumination plotter which comprises a mobile vehicle adapted to move along the thoroughfare, adjustable supporting means mounted on the vehicle for supporting a plurality of light sensing devices, and a plurality of spaced light sensing devices mounted on said supporting means and movable therewith to pre-selected positions relative to said vehicle. Signal amplifying means is mounted on the vehicle and connected to the light sensing devices for receiving signals therefrom. A recording system is mounted on the vehicle and connected to the amplifying means for receiving amplified signals therefrom for visual recordation.

In a preferred embodiment of the invention, a pair of light sensitive photoresister devices are utilized and the light responsive upper surface of each of the devices is convex to facilitate maximum response to incident light. A two-channel amplifier is utilized, and the outputs therefrom are used to operate a two-pen strip chart recorder.

A major object of the invention is to provide apparatus for plotting the levels of illumination along a thoroughfare in an accurate and expeditious manner.

An additional object of the invention is to provide an illumination plotter for evaluating a thoroughfare illumination system, which plotter can be adjusted to permit selected zones of illumination to be plotted.

Another object of the invention is to provide a mobile illumination plotter which is simply constructed and permits substantially instantaneous detection of the intensity of artificial light at locations along lighted thoroughfares.

Additional objects and advantages of the invention will become apparent as the following detailed description is read in conjunction with the accompanying drawings which illustrate the invention.

Brief Description of the Drawings

FIG. 4 is a plan view of the supporting structure used to support the illumination sensing devices of the invention in an exposed location.

FIG. 5 is a sectional view taken along line 5—5 of FIG. 4.

FIG. 6 is a sectional view taken along line 6—6 of FIG. 4.

FIG. 7 is a plan view of one of the illumination sensing devices used in the illumination plotter of the invention.

FIG. 8 is a schematic perspective view of the electrical and read-out portion of the apparatus of the invention.

DETAILED DESCRIPTION OF A PREFERRED EMBODIMENT OF THE INVENTION

Figure 1:
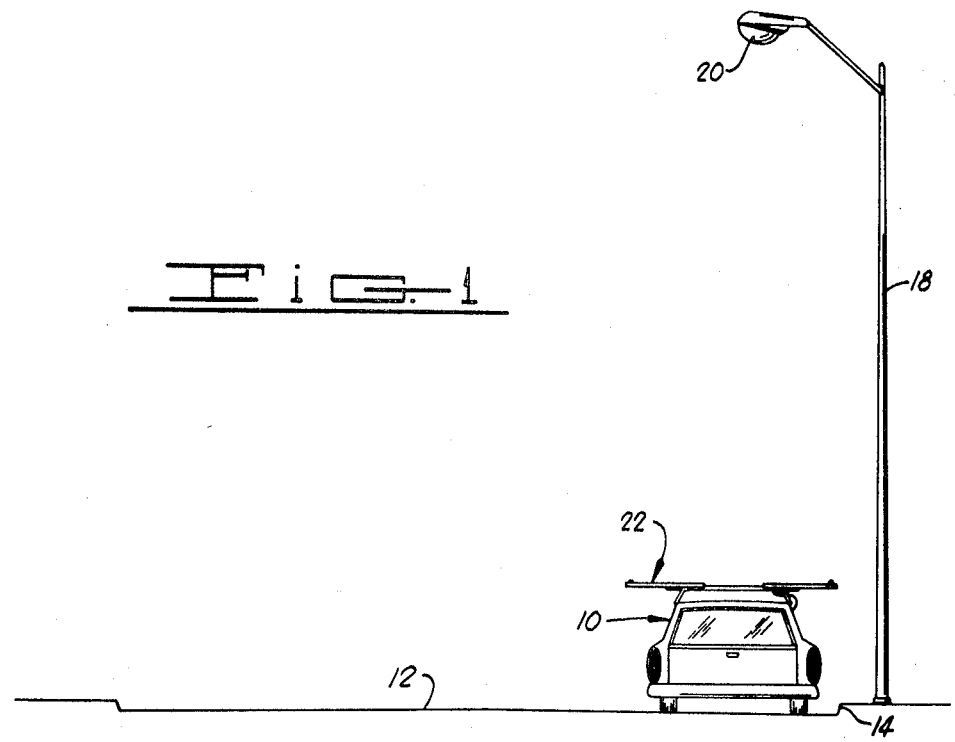
FIG. 1 is a view in elevation illustrating the illumination plotter device of the invention being used for plotting the illumination along a thoroughfare.
Figure 2:
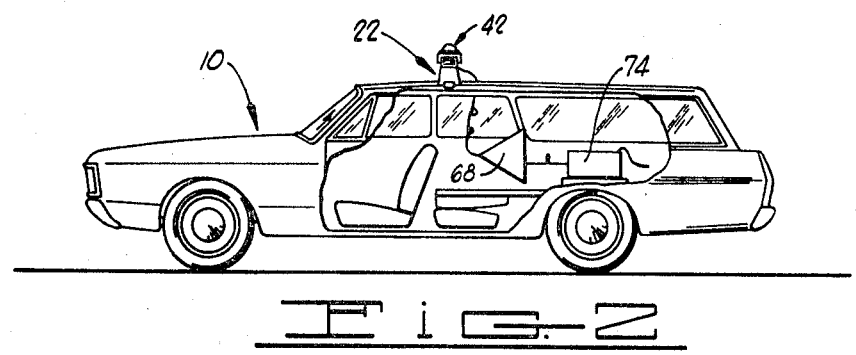
FIG. 2 is a side elevation view of the illumination plotter device of the invention with parts broken away to show a portion of the apparatus located inside a vehicle.

Referring initially to FIG. 1 of the drawings, there is there illustrated an automotive vehicle 10 which is depicted as moving along a thoroughfare 12 adjacent one curb 14 thereof. Extending upwardly from the ground adjacent the thoroughfare 12 is a light pole 18 carrying at its upper end a mercury vapor luminaire 20 or other suitable source of illumination for lighting the thoroughfare.

Positioned atop the automotive vehicle 10 is a supporting structure designated generally by reference numeral 22. The supporting structure 22 includes an elongated, hollow top carrier 23 and a pair of legs 24 and 25 which are adapted to have their ends clamped to the rain gutters or rails 26 along the sides of the top 28 of the automotive vehicle 10 (see FIG. 3). The legs 24 and 25 each have a substantially horizontally extending upper portion of channel or C-shaped cross-sectional configuration as shown in FIG. 5, and the legs receive the opposite end portions of the hollow top carrier 23. The top carrier 23 is slotted at the bottom along the length thereof to permit a retainer plate 30 to be movably positioned on the hollow interior thereof. Retainer screws 32 are extended through the upper portions of the legs 24 and 25 and through the retainer plate 30 to permit the elongated hollow top carrier 23 to be clamped to the legs. This arrangement permits the length of the supporting structure 22 to be adjusted so that it can be secured across the top of substantially any automobile.

Slidably mounted on the top carrier 23 in end-to-end relation are a pair of elongated channel extension bars 34. The channel extension bars 34 are each provided with elongated slots 36 which are located above and in alignment with elongated slots 38 formed in the top carrier 23. Extended through the slots 36 and 38 are wing nuts 40 which permit adjustment of each of the channel extension bars 34 on the top carrier 23. Thus, by loosening the wing nuts 40 and sliding the channel extension bars 34 outwardly (in a transverse direction with respect to the automotive vehicle 10), the channel extension bars can be moved to the positions illustrated in dashed lines in FIGS. 3 and 4. The purpose of such adjustment of the channel extension bars 34 will be hereinafter explained in greater detail.

Mounted near the outer end of each of the channel extension bars 34 is a light or illumination sensing device designated generally by reference numeral 42. In a preferred embodiment of the invention, each of the light sensing devices is a light sensitive photoresistor which has its light sensitive surface made of cadmium sulphide. The light sensitive surface of each of the light sensitive devices 42 is shown in detail in FIG. 6 and 7, and is designated by reference numeral 44. As shown in FIG. 6, the photoresistor devices used in a preferred embodiment of the invention are specially constructed to have a hemispherically shaped, convex upper surface carrying the light sensitive cadmium sulphide material. The cadmium sulphide material is, as shown in FIG. 7, disposed on the convex upper surface in a helical or spiral configuration and, as shown in FIG. 6, the convolutions of the spiral of cadmium sulphide are separated by non-conducting or dielectric material constituted by the ceramic base hereinafter described. As is well understood in the art, this material undergoes a change in its electrical resistance in direct proportion to the amount of light which impinges thereon. The helical or spiral configuration of the light sensitive material provides an especially long conductive path susceptible over its length to change in its electrical resistance, and because of the length of this path, provides an especially sensitive response to light impinging on the sensing device.

The cadmium sulphide material 44 is bonded to a ceramic base 46, also of hemispherical configuration, and a suitable protective seal 48 is disposed inside of and supports the ceramic base 46. The protective seal 48 is bonded to a molded plastic plug 50 which carries suitable spring retainer elements 52 which can be biased inwardly in resilient deformation to permit each light sensing device 42 to be pressed through an aperture 54 formed in the upper side of the respective channel extension bar 34 in which it is mounted. This construction permits quick and easy installation or removal and replacement of each of the light sensitive devices 42. The appearance of the light sensitive devices 42 as they appear in plan view is illustrated in FIG. 7.

Extending through the protective seal 48 at the uppermost central portion of each of the hemispherically shaped light sensitive elements 42 is an electrical conductor 56 which is electrically connected to the cadmium sulphide material 44. A second electrical conductor 58 is extended through the protective seal 48 into contact with the lower peripheral edge of the cadmium sulphide as shown in FIG. 6. Preferably, the electrical conductors 56 and 58 are copper electrodes which are connected at their inner ends to socket members 60 and 62 to which suitable flexible electrical leads 64 and 66 can be connected and disconnected when the light sensitive devices 42 are connected or disconnected from the respective channel extension bars 34 in which they are mounted.

Figure 3:
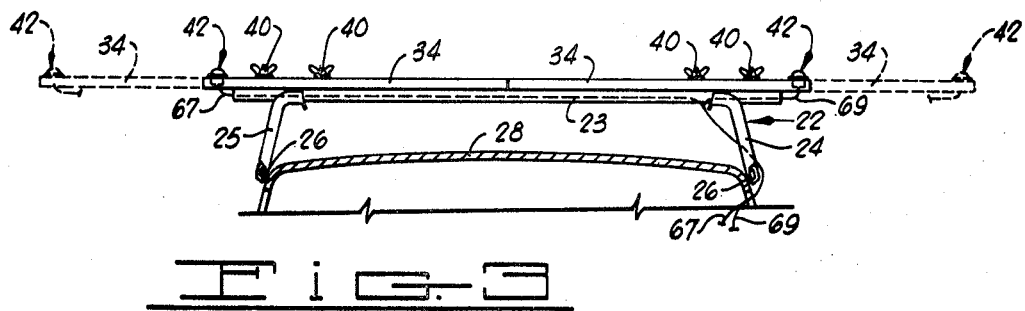
FIG. 3 is a view partly in section and partly in elevation illustrating the detecting portion of the illumination plotter device of the invention. Dashed lines are employed to illustrate the position occupied by certain portions of the apparatus during certain uses thereof.

As shown in FIGS. 3–5, the paired electrical leads 67 and 69 are extended through the length of the inside of the top carrier 23 and out the open end of the top carrier at one end thereof, thence through a window or other suitable opening in the automotive vehicle 10. The paired leads 67 and 69 from the two light sensitive devices 42 are then connected to a signal amplifying device 68 which, in a preferred embodiment of the invention, is a double channel amplifier of any suitable type well known in the electronics field. The channels of the amplifier 68 are connected by suitable leads 70 and 72 to a pair of pen motors 74 and 76 which drive the styluses or pens 78 and 80 in response to electrical signals received at the pen motors from the amplifier 68. The pens 78 and 80 scribe significant indicia representative of the signal output of the amplifier 68 upon a continuous chart 82. The output of the amplifier 68 is in turn responsive to signals received from the light sensitive devices 42.

OPERATION

In the use of the illumination plotter of the invention, the automotive vehicle 10 is driven down a thoroughfare along which it is desired to evaluate the adequacy or characteristics of the illumination provided. The automotive vehicle 10 is initially driven along the curb or relatively close to the curb and the electrical circuitry which includes the amplifier 68, the light sensitive devices 42 and the pen motors 74 and 76 is energized. As the vehicle moves along the thoroughfare, light emanating from sources such as the mercury vapor luminaire 20 depicted in FIG. 1 impinges upon the light sensitive devices 42, and the impingement of light on these devices causes a change in the resistance of the cadmium sulphide material 44 to occur. This, in turn, changes the resistance characteristic of the electrical circuit in which each photoresistor is located, so that a signal which is directly proportional to the amount of light impinging upon the photoresistor is developed. The spectral response of the light sensitive devices 42 is made to closely approximate that of the human eye. It will be noted that the horizontal positioning of the photoresistors or light sensitive devices 42 can be adjusted by sliding the adjustable channel extension bars 34 along the top carrier 23 to space the light sensitive devices 42 further from, or closer to, each other as the particular width or geometric characteristics of a given thoroughfare may dictate.

It is important to note that the hemispherical configuration of the photoresistor light sensitive surface which is constituted by the cadmium sulphide material 44 permits the light sensitive devices to be more responsive to light which may be incident upon the device from substantially any direction above or to one side of the device. Of course, any change in quantity of the impinging light resulting from shadows, or any object interfering with the transmission of the light rays from the mercury vapor luminaire 20 to the thoroughfare, will result in a change in the photoresistors' electrical resistance and will change the output from the amplifier 68. The dual signals which are developed by the two channel amplifier 68 as a result of its response to signals originating at the two light sensitive devices 42 are directed to the pen motors 74 and 76 which respond by imparting motions to the pens 78 and 80. Each of the pens 78 and 80 corresponds to one of the light sensitive devices 42, and effectively scribes a trace on the continuous chart 82. The traces indicate by peaks and depressions, the locations along the street at which zones of greater or lesser light intensity occur. In other words, the rate of travel of the continuous chart 82 is correlated to the rate of travel of the automotive vehicle 10 along the street, and the chart may accordingly be graduated in terms of a particular position along the street corresponding to a position on the chart. Thus, the peaks and the curves which are scribed by the pens 78 and 80 can be interpreted to permit analysis of the illumination pattern along the thoroughfare.

The illumination recording should be taken late at night, preferably after the night traffic has diminished, so that anomalies and errors in the true light intensity readings developed by the apparatus are not produced by spurious light from automobile headlights or the like. While the recordings are being taken, the automotive vehicle 10 should be traveling in a straight line and at a relatively uniform rate of speed of approximately twenty miles per hour. The complete roadway or thoroughfare can be profiled by charting the outside lane, then coming back and charting the next lane toward the center of the thoroughfare and so forth until the entire thoroughfare has been covered. The charts can be further marked manually or in any other suitable way to indicate the location on the chart which corresponds to a point of alignment of the automotive vehicle with one of the lamp posts 18 and its corresponding mercury vapor luminaire.

After the charts have been obtained, they can be used to evaluate the initial performance of a newly installed thoroughfare lighting system. They can also be employed for the purpose of recording the depreciation of the light system over a given period of time, thereby establishing a predictable depreciation rate for fixture and locality. Moreover, the information obtained with the illumination plotting apparatus of the invention can also be utilized to accurately compare the performances of the mercury vapor luminaires of different manufacturers after installation to assist in future purchasing decisions. The performance of each of the luminaires in a system can be evaluated for lumen output and effectiveness of light pattern, and the system as a whole can be checked for comparison with the engineered design and installation. Information derived from the apparatus can also be used for more effectively scheduling cleaning periods for cleaning the globes or transparent covers of the lamps.

From the foregoing description of the invention, it will be seen that the present invention provides an effective and highly useful method for plotting illumination characteristics, particularly the characteristics of a lighting system used for night lighting of thoroughfares. The system can be easily constructed, and the vehicle which forms a part of the system can be used either as a part of the system, or portions of the system dismantled therefrom to permit other uses of the vehicle. The equipment employed in the system is relatively economical, and the construction and maintenance of the illumination plotter system is relatively inexpensive.

What is claimed is:

1. A light sensing device comprising:
   a convexly shaped body of light sensitive material which undergoes a change in its electrical properties when light impinges thereon, said body further having a spiral configuration within the overall convex shape thereof, and said body having an exposed upper surface and a lower side;
   a rigid base of a dielectric material supporting said light sensitive material in said convex configuration and projecting between the convolutions of the spiral of said light sensitive material; and
   a pair of electrical leads extending through said base into contact with said light sensitive material at two spaced points at opposite ends of said spiral of light sensitive material.

2. A light sensing device as defined in claim 1 and further characterized to include a plug element connected to said base and adapted for snap insertion in an aperture in a rigid member.

3. A light sensing device as defined in claim 1 wherein said rigid base is hemispherically shaped, and said light sensitive material is a material which undergoes a change in its electrical resistance in direct proportion to the amount of light which impinges thereon.

* * * * *